(12) United States Patent
Chae et al.

(10) Patent No.: US 10,720,875 B2
(45) Date of Patent: Jul. 21, 2020

(54) APPARATUS FOR CONTROLLING DRIVE MOTOR OF VEHICLE AND METHOD USING THE SAME

(71) Applicants: Hyundai Motor Company, Seoul (KR); Kia Motors Corporation, Seoul (KR)

(72) Inventors: WoongChan Chae, Gyeonggi-do (KR); Sanghoon Moon, Gyeonggi-do (KR); Jung Shik Kim, Seoul (KR); Kyungsoo Park, Daejeon (KR); YoungJin Shin, Gyeongsangnam-do (KR); Hyoungjun Cho, Gyeonggi-do (KR); Sangjin Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/451,373

(22) Filed: Jun. 25, 2019

(65) Prior Publication Data
US 2020/0112284 A1 Apr. 9, 2020

(30) Foreign Application Priority Data
Oct. 8, 2018 (KR) .................. 10-2018-0119968

(51) Int. Cl.
*G05B 5/00* (2006.01)
*G05D 23/00* (2006.01)
*H02H 7/08* (2006.01)
*H02P 29/66* (2016.01)
*B60W 30/194* (2012.01)
*B60W 10/08* (2006.01)
*H02P 27/04* (2016.01)

(52) U.S. Cl.
CPC .......... *H02P 29/664* (2016.11); *B60W 10/08* (2013.01); *B60W 30/194* (2013.01); *H02P 27/04* (2013.01)

(58) Field of Classification Search
CPC .................................................... H02P 29/664
USPC ......................................................... 318/471
See application file for complete search history.

(56) References Cited

U.S. PATENT DOCUMENTS

| 9,048,766 | B2* | 6/2015 | Perisic | H02P 29/032 |
| 9,054,613 | B2* | 6/2015 | Hanada | H02P 27/08 |
| 2002/0074803 | A1* | 6/2002 | Kajiura | H02J 7/1492 |
|  |  |  |  | 290/40 F |
| 2014/0117909 | A1* | 5/2014 | Kim | H02P 7/06 |
|  |  |  |  | 318/473 |
| 2016/0226428 | A1* | 8/2016 | Kim | H02P 25/024 |

* cited by examiner

*Primary Examiner* — Erick D Glass
(74) *Attorney, Agent, or Firm* — Mintz Levin Cohn Ferris Glovsky and Popeo, P.C.; Peter F. Corless

(57) ABSTRACT

An apparatus for controlling a drive motor of a vehicle in which a wound rotor synchronous motor is mounted includes: an inverter which controls a stator current supplied to a stator of the drive motor and a rotor current supplied to a rotor of the drive motor; and a drive motor controller which controls the inverter such that the stator current and the rotor current are supplied to the drive motor when a temperature of the rotor is less than a threshold value, and only the stator current is supplied to the drive motor when the temperature of the rotor is greater than or equal to the threshold value.

7 Claims, 3 Drawing Sheets

APPARATUS FOR CONTROLLING DRIVE MOTOR OF VEHICLE AND METHOD USING THE SAME

CROSS-REFERENCE TO RELATED APPLICATION

This application claims under 35 U.S.C. § 119(a) the benefit of Korean Patent Application No. 10-2018-0119968 filed in the Korean Intellectual Property Office on Oct. 8, 2018, the entire contents of which are incorporated herein by reference.

BACKGROUND

(a) Technical Field

The present disclosure relates to an apparatus for controlling a drive motor of a vehicle and a method using the same.

(b) Description of the Related Art

An environmentally-friendly vehicle represents a pollution-free or low-pollution vehicle with high energy consumption efficiency. The typical environmentally-friendly vehicle may include an electric vehicle and a hybrid vehicle. The electric vehicle uses an electric motor (hereinafter referred to as a "drive motor") as a power source, and the hybrid vehicle uses an engine and a drive motor as power sources.

In a drive motor of an environmentally-friendly vehicle, rare-earth materials such as neodymium (Nd) and dysprosium (Dy) are used to increase the output density. The rare-earth materials used in drive motors may be found only in some countries, including China, and are very expensive and prone to price fluctuations. Accordingly, development of drive motors using non-rare-earth materials is underway to reduce the price of the drive motor.

A wound rotor synchronous motor (WRSM) in non-rare-earth motors has attracted attention for performance similar to an internal permanent magnet synchronous motor (IPMSM).

The wound rotor synchronous motor (WRSM) is a structure in which a rotor wound by a rotor coil and a stator are disposed with a predetermined gap, and a magnetic flux may be generated by applying current to the rotor coil instead of using a permanent magnet. Because of this structural feature, the wound rotor synchronous motor (WRSM) causes copper loss (I2R) due to current in the rotor. However, in most vehicles, a water-cooled channel is designed for cooling the stator of the drive motor, making it difficult to cool the rotor of the drive motor.

In order to solve this problem, in a vehicle using the wound rotor synchronous motor (WRSM), derating the drive motor output to protect the drive motor may be used when the rotor temperature of the wound rotor synchronous motor (WRSM) is extremely high. However, when using this method, there is a problem that the performance of the vehicle is deteriorated due to the output limit of the drive motor.

The above information disclosed in this Background section is only for enhancement of understanding of the background of the disclosure and therefore it may contain information that does not form the prior art that is already known in this country to a person of ordinary skill in the art.

SUMMARY

The present disclosure provides an apparatus and a method for controlling a drive motor that can stably maintain a rotor temperature without adding a cooling system in a vehicle using a wound rotor synchronous motor (WRSM).

An apparatus for controlling a drive motor of a vehicle in which a wound rotor synchronous motor is mounted according to an exemplary embodiment of the present disclosure, the apparatus may include an inverter which controls a stator current supplied to a stator of the drive motor and a rotor current supplied to a rotor of the drive motor; and a drive motor controller which controls the inverter such that the stator current and the rotor current are supplied to the drive motor when a temperature of the rotor is less than a threshold value, and only the stator current is supplied to the drive motor when the temperature of the rotor is greater than or equal to the threshold value.

The drive motor may be operated in a WRSM (wound rotor synchronous motor) mode by the stator current and the rotor current when the temperature of the rotor is less than the threshold value.

The drive motor may be operated in a SynRM (synchronous reluctance motor) mode by the stator current when the temperature of the rotor is greater than or equal to the threshold value.

The apparatus may further include a memory which stores a first current map of the WRSM mode including stator current and rotor current corresponding to a torque of the drive motor and a second current map of the SynRM mode including stator current corresponding to the torque of the drive motor; wherein the drive motor controller may acquire the stator current and the rotor current from the first current map when the temperature of the rotor is less than the threshold value, and the drive motor controller may acquire the stator current from the second current map when the temperature of the rotor is greater than or equal to the threshold value.

A method for controlling a drive motor of a vehicle in which a wound rotor synchronous motor is mounted according to another exemplary embodiment of the present disclosure, the method may include detecting, by a temperature sensor, a temperature of a rotor of the drive motor; operating, by a controller, the drive motor in a WRSM (wound rotor synchronous motor) mode when the temperature is less than a threshold value; and operating, by the controller, the drive motor as a SynRM (synchronous reluctance motor) mode when the temperature is greater than or equal to the threshold value.

Operating the drive motor in the WRSM mode may include receiving a torque command from a superordinate controller, and supplying currents to a stator and the rotor of the drive motor according to the torque command.

The operating the drive motor in the SynRM mode may include receiving a torque command from a superordinate controller, and only supplying currents to a stator of the drive motor according to the torque command.

According to an exemplary embodiment of the present disclosure, it is not necessary to change the cooling system for cooling the rotor or to add a cooling system for cooling the rotor, so that the over-temperature state of the rotor can be solved without additional cost.

Further, the performance deterioration of the drive motor can be minimized in the process of resolving the over-temperature state of the rotor, compared to the conventional method of directly derating the output of the drive motor.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
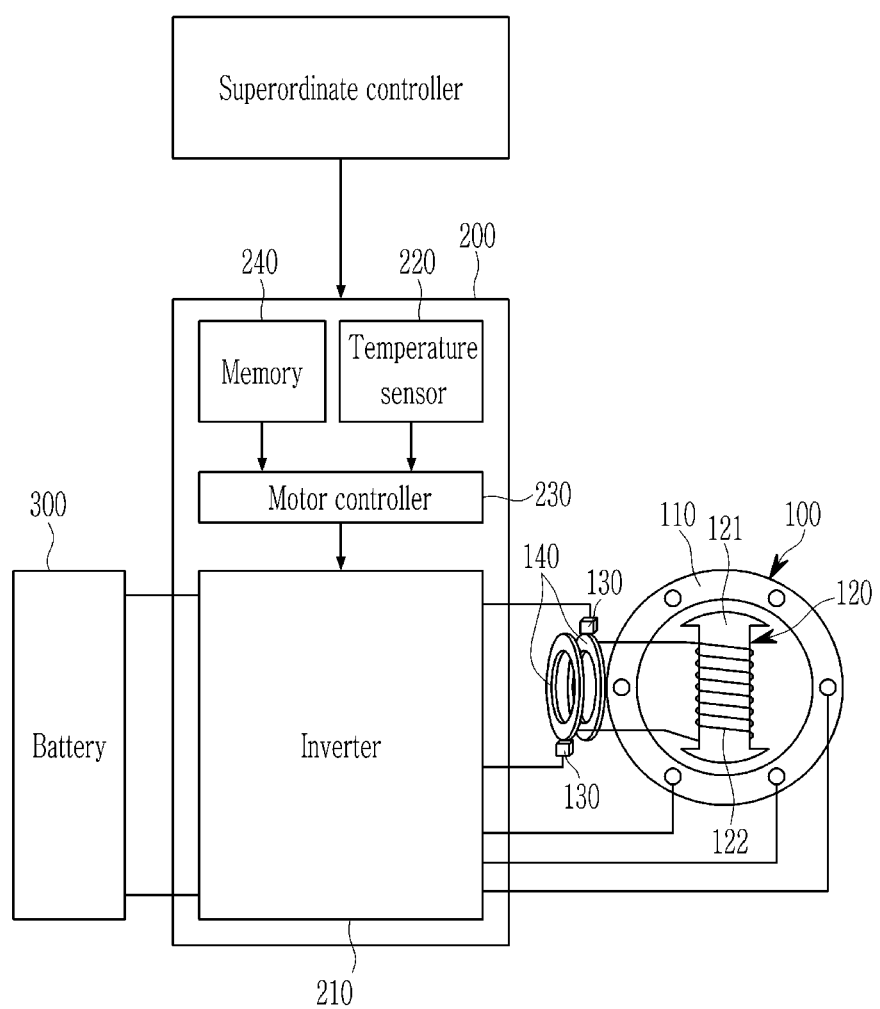
FIG. 1 is a schematic view of an apparatus of controlling a drive motor according to an exemplary embodiment of the present disclosure.
Figure 2:
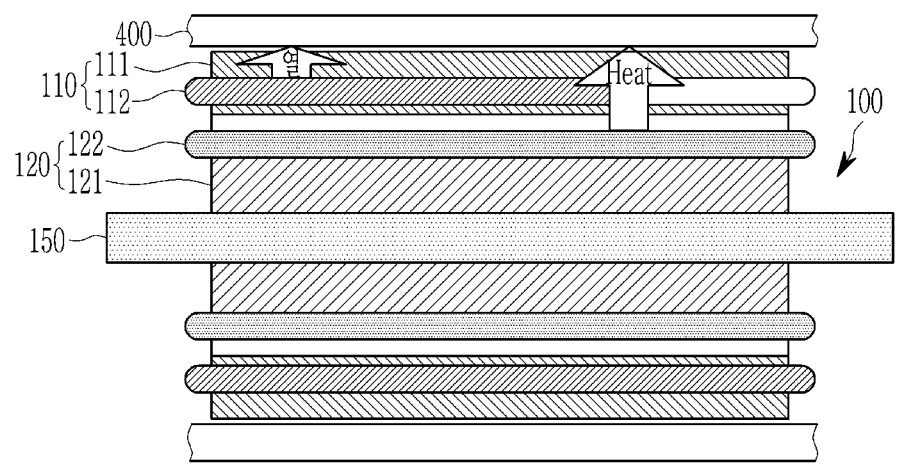
FIG. 2 is a schematic view of a positional relationship between the drive motor and a water-cooled channel according to an exemplary embodiment of the present disclosure.

FIG. 1 is a schematic view of an apparatus of controlling a drive motor according to an exemplary embodiment of the present disclosure. FIG. 2 illustrates a positional relationship between the drive motor and a water-cooled channel according to an exemplary embodiment of the present disclosure.

Referring to FIG. 1, a drive motor 100 receives electrical energy from a battery 300 and generates driving torque for driving a vehicle, and the drive motor 100 may be a WRSM (Wound Rotor Synchronous Motor).

The drive motor 100 may include a stator 110, a rotor 120, a brush 130 and a slip ring 140.

The stator 110 may include a stator body 111 (see FIG. 2), and a stator coil 112 (see FIG. 2) wound in the stator body 111. The rotor 120 is rotatably disposed inside the stator 110 with a predetermined gap.

The rotor 120 may include a rotor core 121 as a body and a rotor coil 122 wound in the rotor core 121. A rotation shaft 150 is disposed in a central portion of the rotor 120, and the rotor 120 is disposed in the stator 110 such that an external surface of the rotor 120 is separated from an internal surface of the stator with a predetermined gap.

The brush 130 supplies DC current supplied from the inverter 220 to the rotor coil 122 through the slip ring 140.

The slip ring 140 is fixedly mounted in an end portion of the rotation shaft 150, and electrically connected with both ends of the rotor coil 122. The slip ring 140 transmits the DC current supplied from the brush 130 to the rotor coil 122.

Further, a coil 122 is wound in the rotor 120 in such a structure of the WRSM. Accordingly, it is possible to control an operation of the drive motor 100 by the stator current supplied to the stator coil 112 and the rotor current supplied to the rotor coil 122.

Referring to FIG. 1, an apparatus 200 of controlling the drive motor 100 may include an inverter 210, a temperature sensor 220, a drive motor controller 230 and a memory 240.

The inverter 210 receives electrical energy from a battery 300, and controls current output to the stator coil 112 and the rotor coil 122 of the drive motor 100 based on a control signal of the drive motor controller 230. As provided herein, current that is supplied to the stator coil 112 through the inverter 210 will be referred to as a stator current (Id, Iq), and current that is supplied to the rotor coil 122 through the inverter 210 will be referred to as a rotor current (Ir). The stator current (Id) is used to transform the current applied to the stator coil 112 into magnetic flux, and the stator current (Iq) is used to transform the current applied to the stator coil 112 into torque.

The temperature sensor 220 is mounted at the rotor core 121 or disposed near to the rotor core 121, and detects a temperature of the rotor 120.

The drive motor controller 230 may control the drive motor 100 by controlling the stator current (Id, Iq) and the rotor current (Ir) output through the inverter based on the torque command received from a superordinate controller (e.g., the vehicle controller).

The temperature of the rotor 120 detected by the temperature sensor 220 is transmitted to the drive motor controller 230, and the drive motor controller 230 controls the drive motor 100 to be operated in a WRSM (wound rotor synchronous motor) mode or a SynRM (synchronous reluctance motor) mode based on the temperature of the rotor 120.

When the drive motor 100 is operated in the WRSM (wound rotor synchronous motor) mode, the drive motor controller 230 controls the inverter 210 such that current is supplied to the stator coil 112 of the stator 110 and the rotor coil 122 of the rotor. In the WRSM (wound rotor synchronous motor) mode, the drive motor 100 supplies driving torque by generating magnetic torque and reluctance torque.

When the drive motor 100 is operated in the SynRM (synchronous reluctance motor) mode, the drive motor controller 230 controls the inverter 210 such that current is only supplied to the stator coil 112 of the stator 110. In the SynRM (synchronous reluctance motor) mode, the drive motor 100 supplies driving torque by generating reluctance torque.

Accordingly, output performance of the drive motor 100 may be improved when the drive motor 100 is operated in the WRSM mode comparing to the SynRM mode.

Meanwhile, when the drive motor 100 is operated in the WRSM (wound rotor synchronous motor) mode, copper loss is caused by current application in the stator coil 112 and the rotor coil 122. On the contrary, current is applied only to the stator coil 112 of the drive motor 100, and copper loss occurs only in the stator coil 112, so that heat generation of the rotor 120 can be minimized when the drive motor 100 is operated in the SynRM mode.

As shown in FIG. 2, in a cooling system of the vehicle, a water-cooled channel 400 is disposed in outside of the stator 110. In this cooling system, cooling performance of the drive motor 100 may be improved in the SynRM mode as compared to the WRSM mode.

Therefore, according to an exemplary embodiment of the present disclosure, the drive motor controller 230 controls the drive motor 100 to be operated in the SynRM mode such that the temperature of the rotor 120 can be reduced when the temperature of the rotor 120 is greater than or equal to a threshold value. On the contrary, the controller 230 controls the drive motor 100 to be operated in the WRSM mode such that output performance can be improved when the temperature of the rotor 120 less than the threshold value.

For this, the memory 240 may store current maps corresponding to the WRSM mode and the SynRM mode, respectively. The current map of the WRSM mode includes stator currents (Id, Iq) and rotor currents (Ir) corresponding to a torque of the drive motor 100. And the current map of the SynRM mode includes stator currents (Id, Iq) corresponding to a torque of the drive motor 100.

When the drive motor controller 230 receives a torque command from a superordinate controller, the drive motor controller 230 selects an operation mode (WRSM mode, or SynRM mode) based on the temperature of the rotor 120, and acquires the stator current (Id, Iq) and/or the rotor current (Ir) supplied to the drive motor 100 from the current map corresponding to the selected operation mode.

The drive motor controller 230 each may be realized as at least one microprocessor programmed with a predetermined program, and the predetermined program may include a set of instructions for performing a method according to an exemplary embodiment of the present disclosure.

Figure 3:
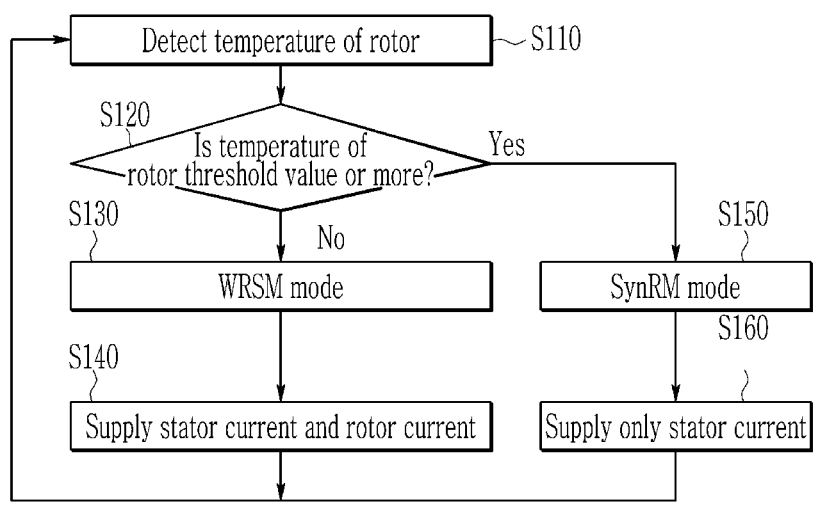
FIG. 3 is a flowchart illustrating a method of controlling the drive motor according to an exemplary embodiment of the present disclosure.

FIG. 3 is a flowchart illustrating a method of controlling the drive motor according to an exemplary embodiment of the present disclosure. The method illustrated in FIG. 3 may be performed by the drive motor controller 230 described with reference to FIGS. 1 and 2.

Referring to FIG. 3, the drive motor controller 230 of the drive motor control system 200 according to an exemplary embodiment of the present disclosure detects the temperature of the rotor 120 through the temperature sensor 220 during operation of the drive motor 100 at step S110, and determines whether the temperature of the rotor 120 is greater than or equal to the threshold value at step S120.

In step S120, when the temperature of the rotor 120 is less than the threshold value, the drive motor controller 230 operates the drive motor 100 in the WRSM mode at step S130. As the drive motor 100 is operated in the WRSM mode, the drive motor controller 230 controls the inverter 210 so that the stator current (Id, Iq) and the rotor current (Ir) are supplied to the stator 110 and the rotor 120 at step S140.

In step S140, the drive motor controller 230 may receive the torque command from the superordinate controller (e.g., vehicle controller) and adjust the stator current (Id, Iq) and the rotor current (Ir) supplied to the drive motor 100 based on the torque command. At this time, the drive motor controller 230 may acquire the stator current (Id, Iq) and the rotor current (Ir) supplied to the drive motor 100 from the current map corresponding to the WRSM mode stored in the memory 240.

In step S120, when the temperature of the rotor 120 is greater than or equal to the threshold value, the drive motor controller 230 operates the drive motor 100 in the SynRM mode at step S150. As the drive motor 100 is operated in the SynRm mode, the drive motor controller 230 controls the inverter 210 so that only the stator current (Id, Iq) is supplied to the stator 110 at step S160.

In step S140, the drive motor controller 230 may receive the torque command from the superordinate controller (e.g., vehicle controller) and adjust the stator current (Id, Iq) supplied to the drive motor 100 based on the torque command. At this time, the drive motor controller 230 may acquire the stator current (Id, Iq) supplied to the drive motor 100 from the current map corresponding to the SynRM mode stored in the memory 240.

The drive motor controller 230 may continuously control the operation of the drive motor 100 by performing steps S110 to S160 until the vehicle is turned off after the vehicle is turned on (i.e., after starting of the vehicle).

As described above, according to the present disclosure, it is possible to prevent the rotor 120 from reaching an excessive temperature (i.e., an over-temperature state) by changing the operation mode of the drive motor 100. Therefore, it is not necessary to change the cooling system for cooling the rotor 120 or to add a cooling system for cooling the rotor 120, so that the over-temperature state of the rotor 120 can be solved without additional cost. In addition, the performance deterioration of the drive motor 100 can be minimized in the process of resolving the over-temperature state of the rotor 120, compared to the conventional method of directly derating the output of the drive motor 100.

A computer readable recording medium includes all kinds of recording device in which data readable by a computer system is stored. Examples of the computer readable recording device include a ROM, a RAM, a CD-ROM, a DVD-ROM, a DVD-RAM, a magnetic tape, a floppy disk, a hard disk, and an optical data storing device. Further, a code distributed in a computer device connected through a network and readable by the computer in a distribution scheme may be stored and executed in the computer readable recording medium.

The accompanying drawings and the detailed description of the disclosure are only an example of the present disclosure, which are used for the purpose of describing the present disclosure but are not used to limit the meanings or a scope of the present disclosure described in claims. Accordingly, those skilled in the art will appreciate that various modifications and equivalent another embodiment may be possible. Further, those skilled in the art may omit some of the constituent elements described in the present specification without deterioration of performance, or add a constituent element for improving performance. In addition, those skilled in the art may change an order of the operations of the method described in the present specification according to a process environment or equipment. Accordingly, the scope of the present disclosure shall be determined by the claims and an equivalent thereof, not by the described implementation embodiments.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. An apparatus for controlling a drive motor of a vehicle in which a wound rotor synchronous motor is mounted, the apparatus comprising:
   an inverter which controls a stator current supplied to a stator of the drive motor and a rotor current supplied to a rotor of the drive motor; and
   a drive motor controller which controls the inverter such that the stator current and the rotor current are supplied to the drive motor when a temperature of the rotor is less than a threshold value, and only the stator current is supplied to the drive motor when the temperature of the rotor is greater than or equal to the threshold value.

2. The apparatus of claim 1, wherein:
   the drive motor is operated in a WRSM (wound rotor synchronous motor) mode by the stator current and the rotor current when the temperature of the rotor is less than the threshold value.

3. The apparatus of claim 1, wherein:
   the drive motor is operated in a SynRM (synchronous reluctance motor) mode by the stator current when the temperature of the rotor is greater than or equal to the threshold value.

4. The apparatus of claim 1, further comprising:
   a memory which stores a first current map of the WRSM mode including stator current and rotor current corresponding to a torque of the drive motor and a second current map of the SynRM mode including stator current corresponding to the torque of the drive motor;
   wherein the drive motor controller acquires the stator current and the rotor current from the first current map when the temperature of the rotor is less than the threshold value, and the drive motor controller acquires the stator current from the second current map when the temperature of the rotor is greater than or equal to the threshold value.

5. A method for controlling a drive motor of a vehicle in which a wound rotor synchronous motor is mounted, the method comprising:
   detecting, by a temperature sensor, a temperature of a rotor of the drive motor;
   operating, by a controller, the drive motor in a WRSM (wound rotor synchronous motor) mode when the temperature is less than a threshold value; and
   operating, by the controller, the drive motor in a SynRM (synchronous reluctance motor) mode when the temperature is greater than or equal to the threshold value.

6. The method of claim 5, wherein operating the drive motor in the WRSM mode includes:
   receiving a torque command from a superordinate controller, and
   supplying current to a stator and the rotor of the drive motor according to the torque command.

7. The method of claim 5, wherein operating the drive motor in the SynRM mode includes:
   receiving a torque command from a superordinate controller, and
   only supplying current to a stator of the drive motor according to the torque command.

* * * * *